US006570733B1

(12) United States Patent
Waugh et al.

(10) Patent No.: US 6,570,733 B1
(45) Date of Patent: May 27, 2003

(54) ADAPTIVE SERVO GAIN ADJUSTMENT TO IMPROVE DISC DRIVE SEEK PERFORMANCE

(75) Inventors: David Charles Waugh, Oklahoma City, OK (US); Lealon Ray McKenzie, Edmond, OK (US)

(73) Assignee: Seagate Technology LLC, Scotts Valley, CA (US)

(*) Notice: Subject to any disclaimer, the term of this patent is extended or adjusted under 35 U.S.C. 154(b) by 547 days.

(21) Appl. No.: 09/070,580

(22) Filed: Apr. 30, 1998

Related U.S. Application Data

(60) Provisional application No. 60/071,160, filed on Jan. 13, 1998.

(51) Int. Cl.$^7$ .............................................. G11B 5/596
(52) U.S. Cl. ................................. 360/78.06; 360/78.09
(58) Field of Search ......................... 360/75, 77.04, 360/78.06, 78.07, 78.09, 78.04, 77.02

(56) References Cited

U.S. PATENT DOCUMENTS

| | | | |
|---|---|---|---|
| 3,883,894 A | 5/1975 | Johnson | |
| 4,333,117 A | 6/1982 | Johnson | |
| 4,480,217 A | * 10/1984 | Robbins et al. | ............. 318/618 |
| 4,622,604 A | 11/1986 | Hashimoto et al. | |
| 4,677,507 A | 6/1987 | Elliott | |
| 4,907,109 A | 3/1990 | Senio | |
| 4,931,889 A | 6/1990 | Osafune | |
| 4,937,689 A | 6/1990 | Seaver et al. | |
| 4,956,831 A | 9/1990 | Sarraf et al. | |
| 4,965,501 A | 10/1990 | Hashimoto | |
| 5,047,876 A | 9/1991 | Genheimer et al. | |
| 5,233,486 A | 8/1993 | Albert | |
| 5,416,759 A | * 5/1995 | Chun | ....................... 369/44.36 |
| 5,481,526 A | * 1/1996 | Nagata et al. | ....... 369/44.29 X |
| 5,657,179 A | 8/1997 | McKenzie | |
| 6,031,684 A | * 2/2000 | Gregg | ................. 360/78.09 X |
| 6,046,878 A | * 4/2000 | Liu et al. | ............. 360/78.09 X |

OTHER PUBLICATIONS

Eddy et al., "Bias in Disk Drive Rotary Actuators; Characterization, Prediction and Compensation, Prediction and Compensation," IEEE Transactions on Industrial Electronics, vol. 33, No. 3, 1997, pp. 2424–2433.

Yamaguchi et al., "Design of Mode Switching Controller with Initial Value Compensation and its Application to Disk Drive Servo Control," IFAC 13$^{th}$ Triennial World Congress, San Francisco, California, USA, 1996, pp. 471–476.

Yamaguchi et al, "Design of Mode Switching Controller with Initial Value Compensation and its Application to Head Positioning Control on Magnetic Disk Drives," IEEE Transactions on Industrial Electronics, vol. 43, No. 1, 1996, pp. 65–73.

* cited by examiner

Primary Examiner—Alan T. Faber
(74) Attorney, Agent, or Firm—Fellera, Snider, et al.

(57) ABSTRACT

A method and apparatus are disclosed for improving seek performance of a disc drive through adaptive servo gain adjustment. The disc drive comprises a head adjacent a rotatable disc and a servo circuit which controllably positions the head adjacent tracks defined on the disc. During a seek operation in which the servo circuit moves the head from an initial track to a destination track, the servo circuit accumulates a velocity error as a sum of a series of velocity errors each obtained as a difference between an actual velocity of the head and a corresponding desired velocity over a selected radial distance of the disc. The servo circuit additionally measures an elapsed time for the head to pass over a second selected radial distance of the disc as the head is decelerated toward the destination track. Thereafter, the servo circuit adjusts a gain of the servo circuit in relation to the accumulated velocity error and the measured elapsed time.

10 Claims, 7 Drawing Sheets

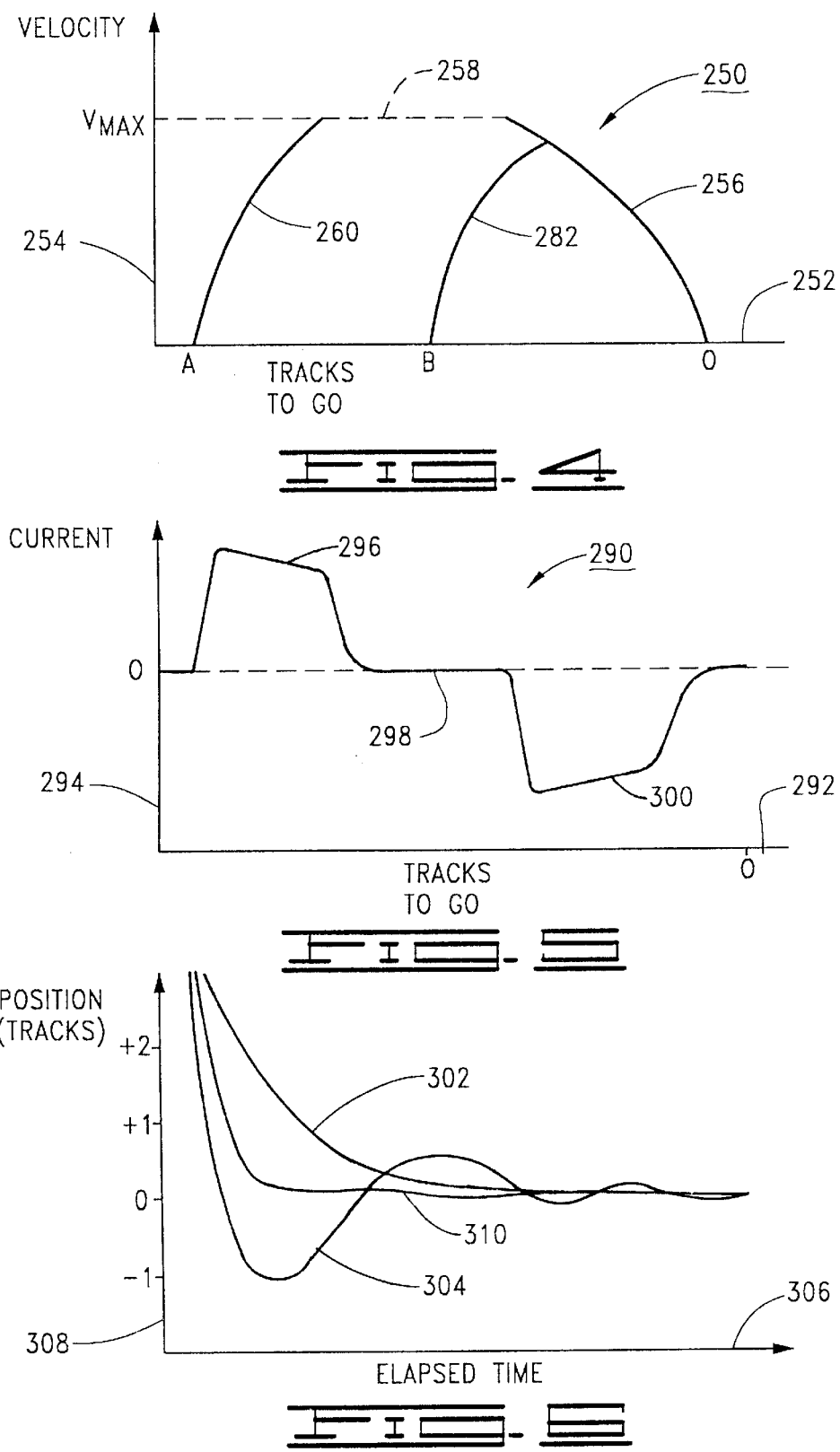

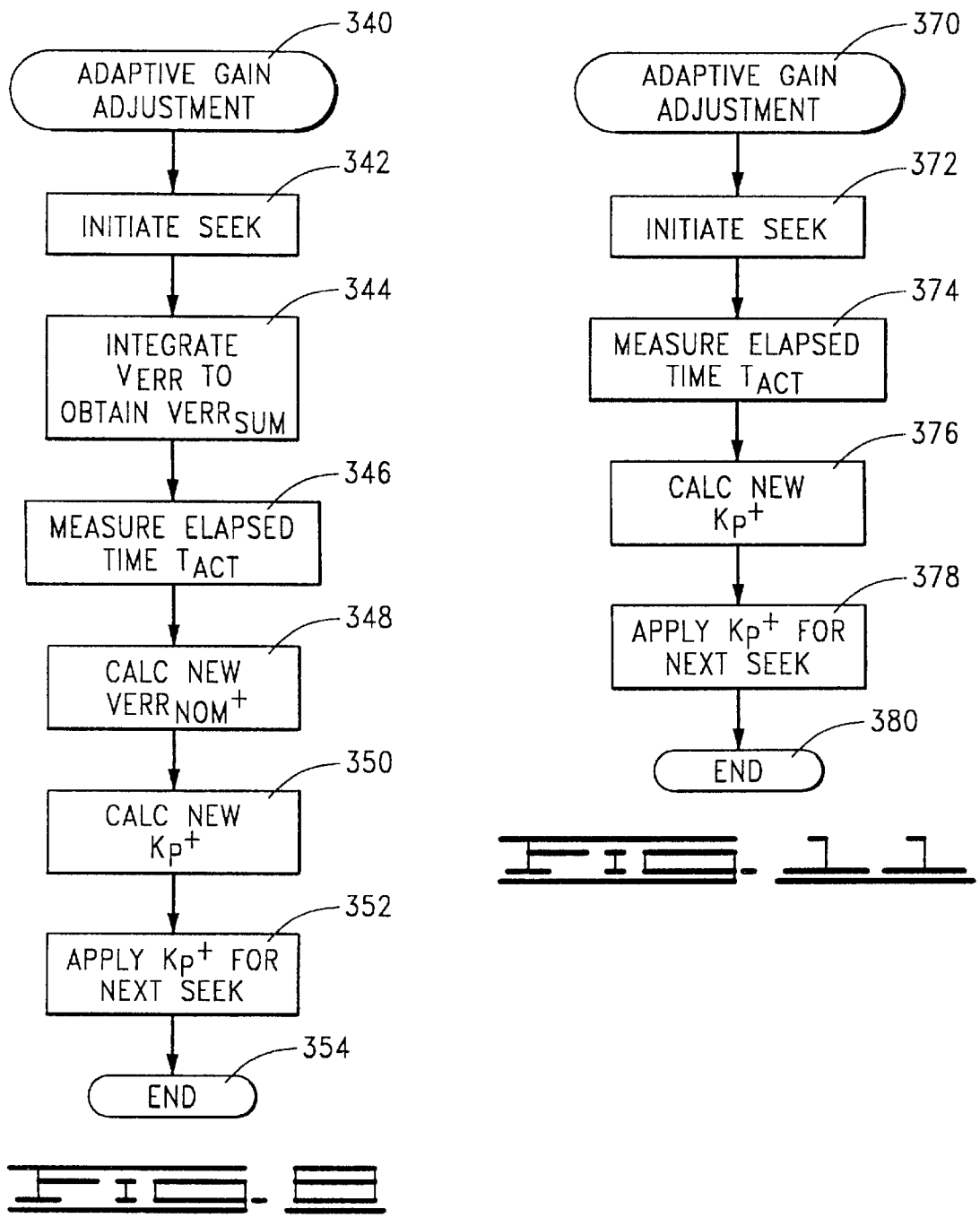

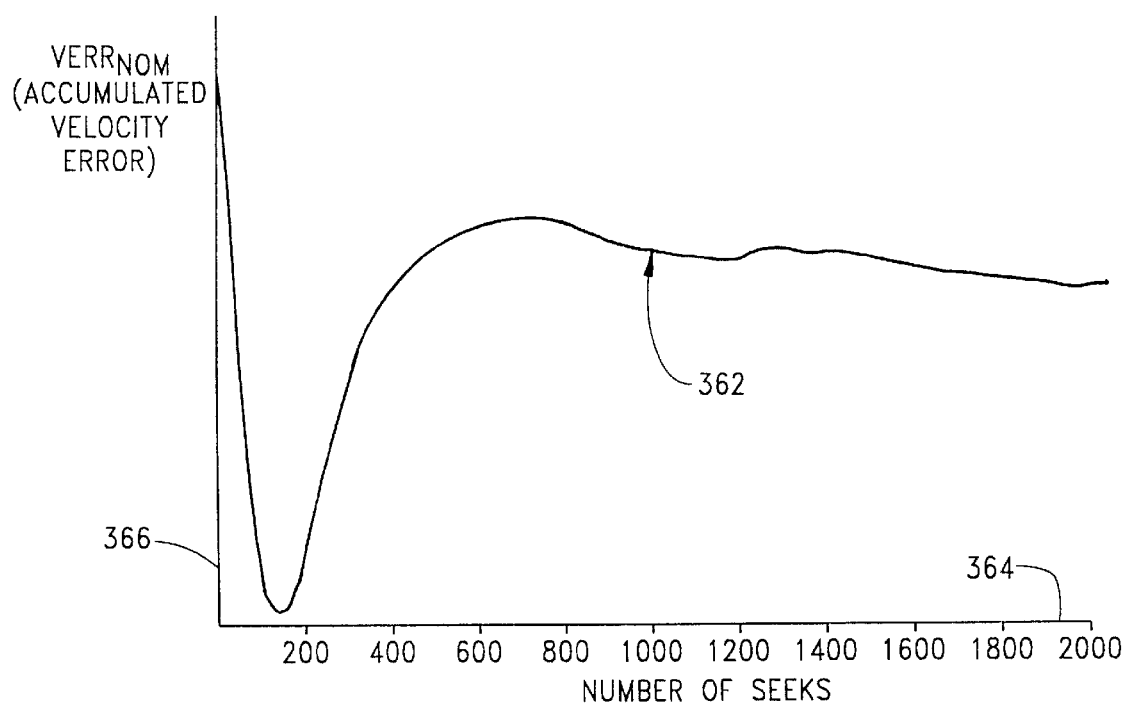
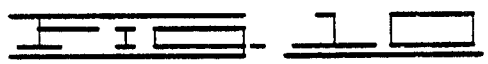
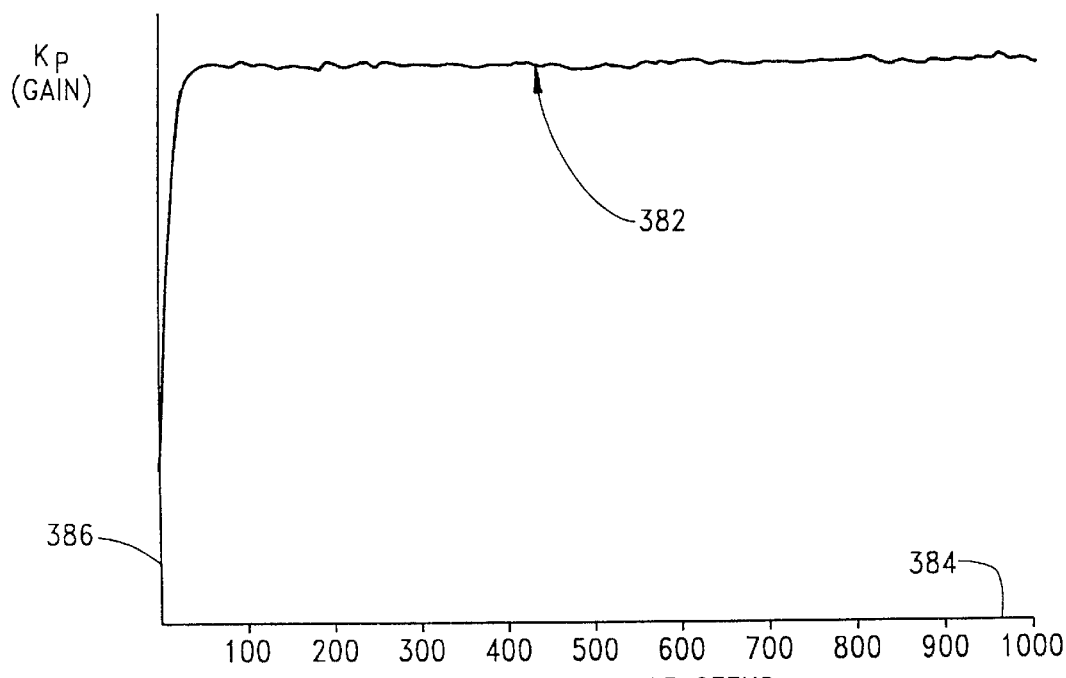
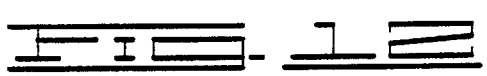

ADAPTIVE SERVO GAIN ADJUSTMENT TO IMPROVE DISC DRIVE SEEK PERFORMANCE

RELATED APPLICATIONS

This application claims priority to Provisional Application No. 60/071,160 entitled METHOD TO MINIMIZE AVERAGE ACCESS TIME, filed Jan. 13, 1998.

FIELD OF THE INVENTION

This invention relates generally to the field of disc drive storage devices, and more particularly, but not by way of limitation, to improving seek performance of a disc drive servo system through adaptive servo gain adjustment.

BACKGROUND OF THE INVENTION

Disc drives are digital data storage devices which enable users of computer systems to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads is disposed adjacent surfaces of the discs to transfer data between the discs and a host computer. The heads are radially positioned over the discs by a rotary actuator and a closed loop, digital servo system, and are caused to fly proximate the surfaces of the discs upon air bearings established by air currents set up by the high speed rotation of the discs.

A plurality of nominally concentric tracks are defined on each disc surface, with disc drives of the present generation having track densities in excess of 4,000 tracks per centimeter (10,000 tracks per inch). A preamp and driver circuit generates write currents that are used by the head to selectively magnetize the tracks during a data write operation and amplifies read signals detected by the head from the selective magnetization of the tracks during a data read operation. A read/write channel and interface circuit are operably connected to the preamp and driver circuit to transfer the data between the discs and the host computer.

The servo system operates in two primary modes: seeking and track following. During a seek, a selected head is moved from an initial track to a destination track on the corresponding disc surface using a velocity-controlled approach. The servo system initially determines a velocity profile indicative of the velocity trajectory the head should take based upon the length of the seek (in terms of tracks to go to the destination track). The servo system next applies current to the actuator coil to first accelerate and then decelerate the head toward the destination track in accordance with the velocity profile.

During the seek, the servo system sequentially measures (estimates) the actual velocity of the head and adjusts the current in relation to velocity error (i.e., the difference between the actual velocity and the target velocity as set forth by the velocity profile). As the head approaches the destination track, the servo system initiates a settle mode to bring the head to rest over the destination track within a selected settle threshold as a percentage of the track width, such as ±10% of track center. Thereafter, the servo system enters the track following mode wherein the head is nominally maintained over the center of the destination track until the next seek is performed.

As will be recognized, a disc drive is primarily utilized to transfer data between the tracks of the discs and the host computer. Such data transfer operations usually cannot occur during a seek, but rather require the drive to be in track following mode. Hence, to maximize disc drive data transfer rate capabilities, high performance disc drives are designed to achieve minimum average seek times, with such drives of the present generation having nominal seek times on the order of eight milliseconds (msec).

Achieving consistently minimum seek times is complicated by the fact that disc drive settle performance can be adversely affected by velocity errors present as the servo system transitions from seek to settle mode. Such an initial velocity variation can cause large overshoot or undershoot of the head relative to the destination track, undesirably extending the time required to settle the head onto the destination track. This velocity variation is inherent in modern disc drive designs because the acceleration constant of the VCM changes with temperature and relative position of the coil. These and other such factors tend to introduce velocity errors during seeks, undesirably extending settling times.

Accordingly, there is a continual need in the art for improvements whereby settling characteristics of a disc drive can be adaptively optimized in the presence of parametric variations which tend to introduce significant levels of head velocity errors.

SUMMARY OF THE INVENTION

The present invention provides an apparatus and method for improving servo performance of a disc drive through adaptive servo gain adjustment.

As exemplified in preferred embodiments, a disc drive is provided with a head adjacent a rotatable disc, and a servo circuit which controllably positions the head adjacent tracks defined on the disc.

During a seek operation in which the servo circuit moves the head from an initial track to a destination track in relation to a velocity profile indicative of a desired velocity trajectory of the head, the servo circuit accumulates a velocity error as a sum of a series of velocity errors each obtained as a difference between an actual velocity of the head and a corresponding desired velocity of the head as set forth by the velocity profile over a selected radial distance of the disc.

The servo circuit additionally measures an elapsed time for the head to pass from a point at a selected distance from the destination track until the head is settled onto the destination track. Thereafter, the servo circuit adjusts a gain of the servo circuit used to control the disc drive during a subsequent seek operation in relation to the accumulated velocity error and the measured elapsed time. In an alternative preferred embodiment, the gain is adjusted solely in relation to the measured elapsed time without regard to the accumulated velocity error.

The servo circuit preferably comprises an observer which provides estimates of head position and velocity during the seek operation, a gain block operably coupled as an input to the observer which applies the gain to a current correction command signal to improve the estimates of head position and velocity provided by the observer and a gain adjust block, operably coupled to the observer and the gain block, which provides the adjusted gain to the observer. The gain is utilized to maintain the observer response nominally that of the disc drive.

Improved servo performance is thus obtained through the convergence of the gain over a series of successive seeks, compensating for factors (such as changes in temperature) which tend to adversely affect servo performance and lengthen settling times due to the introduction of velocity errors as the head is settled onto the destination track.

These and various other features as well as advantages which characterize the present invention will be apparent from a reading of the following detailed description and a review of the associated drawings.

BRIEF DESCRIPTION OF THE DRAWINGS

FIG. 4 is a graphical representation of a velocity profile indicative of a desired velocity trajectory of a selected head during a seek.

FIG. 5 is a graphical representation of a corresponding current profile, indicative of current applied to the actuator coil of the disc drive by the servo circuit in order to carry out a seek in accordance with a velocity profile of FIG. 4.

FIG. 6 is a graphical representation of different types of settling performance by the disc drive, including undesirable undershoot and overshoot responses, as well as a desired, ideal settling response.

FIG. 9 provides a gain convergence curve, illustrating the manner in which the routine of FIG. 8 operates to adaptively converge the gain over a plurality of successively performed seeks.

FIG. 10 provides a corresponding nominal accumulated velocity error convergence curve, which shows the convergence of a nominal accumulated velocity error value used to determine the gain of FIG. 9.

FIG. 11 provides a flow diagram for a second, alternative ADAPTIVE GAIN ADJUSTMENT routine in accordance with a second, preferred embodiment of the present invention. The routine of FIG. 11 is representative of programming utilized by the DSP of FIG. 3 in accordance with a second preferred embodiment.

FIG. 12 provides a second gain convergence curve, illustrating the manner in which the routine of FIG. 11 operates to adaptively converge the gain over a plurality of successively performed seeks.

DETAILED DESCRIPTION

Figure 1:
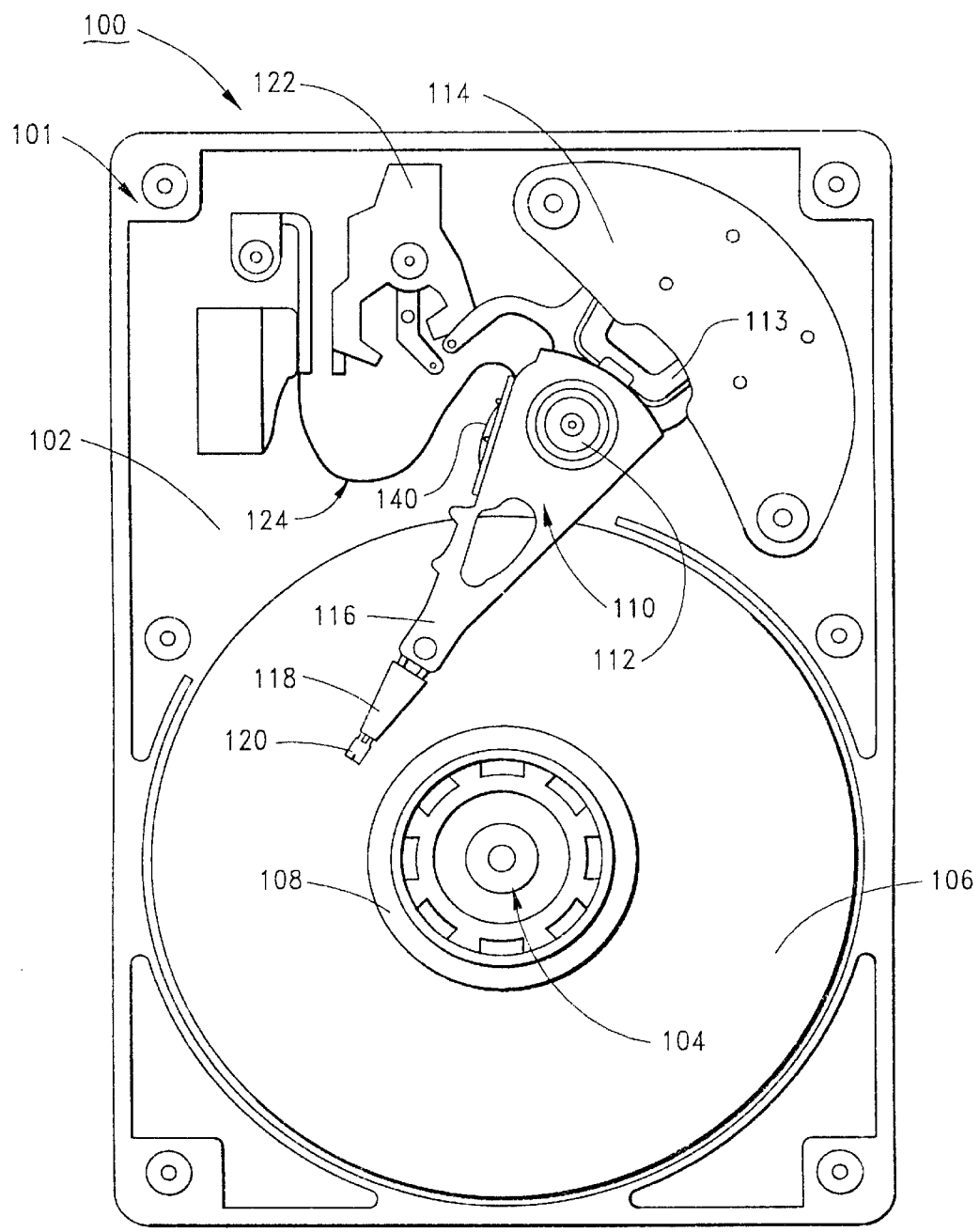
FIG. 1 shows a top plan view of a disc drive constructed in accordance with a preferred embodiment of the present invention.

Referring now to the drawings, FIG. 1 shows a top plan view of a disc drive 100 constructed in accordance with a preferred embodiment of the present invention. The disc drive 100 includes a head-disc assembly (HDA) 101 and a printed wiring assembly (PWA) which is mounted to the underside of the HDA, and thus not visible in FIG. 1.

A top cover, omitted from FIG. 1 to reveal interior portions of the HDA 101, mates with a base deck 102 of the HDA 101 in order to provide a clean internal environment for the HDA 101. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately identified) to which user data are written by way of a rotary actuator assembly 110, which rotates about a cartridge bearing assembly 112 in response to the application of current to a coil (113, a portion of which is visible in FIG. 1) of a voice coil motor (VCM) 114. A plurality of rigid arms 116 extend from the actuator assembly 110, each of which supports a corresponding flexible suspension assembly 118. A plurality of heads 120 are supported by the suspension assemblies 118 over the recording surfaces of the discs 106 by an air bearing established by air currents set up by the high speed rotation of the discs 106. The heads 120 are preferably characterized as magneto-resistive (MR) heads.

A latch assembly 122 secures the actuator assembly 110 when the disc drive 100 is deactivated and a flex circuit assembly 124 allows communication between the actuator assembly 110 and the disc drive PWA, both in a conventional manner.

Figure 2:
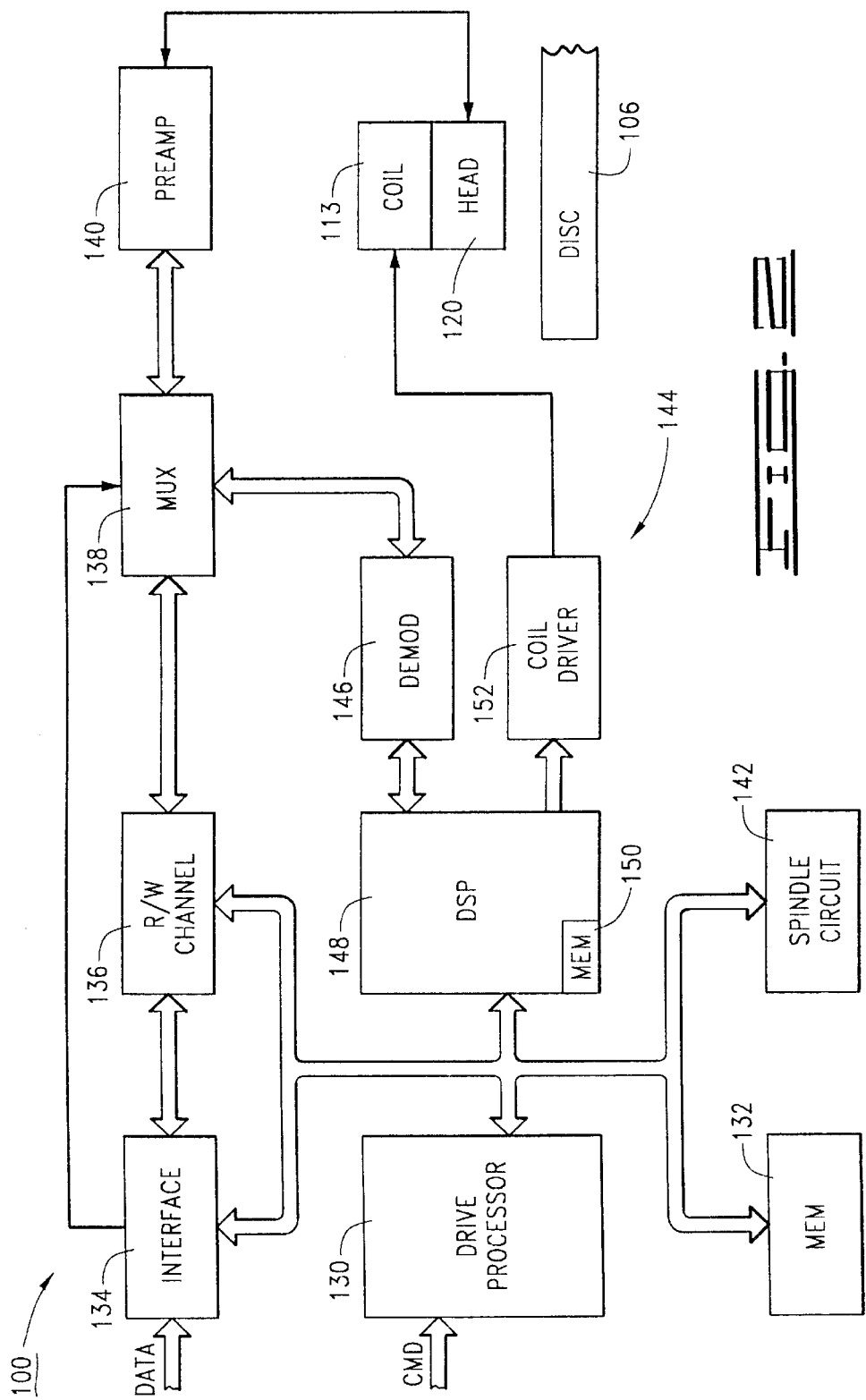
FIG. 2 provides a functional block diagram of the disc drive of FIG. 1, including a servo circuit utilizing a digital signal processor (DSP) to provide servo control for the disc drive.

Referring now to FIG. 2, shown therein is a generalized functional block diagram of the disc drive 100 of FIG. 1, setting forth the operational interconnection of various circuits and components of interest.

Initially, FIG. 2 shows a drive processor 130 which provides top level control of the operation of the disc drive 100. Programming and parameter values utilized by the drive processor 130 are stored in drive processor memory 132 (MEM), which preferably comprises both volatile and non-volatile memory devices such as dynamic random access memory (DRAM) and flash memory. An interface circuit 134 includes a data buffer (not shown) for the temporary buffering of transferred data, and a sequencer (also not shown) which directs the operation of the disc drive 100 during data transfer operations.

During a data write operation, the interface circuit 134 buffers and passes input data to a read/write channel 136, which encodes the data with run-length limited (RLL) and error correction codes (ECC). The encoded data are passed through a selectable multiplexor (mux) 138 to a preamp driver circuit 140 (preamp), with the mux 138 controlled by the sequencer. The preamp 140 applies write currents to the selected head 120 in order to selectively magnetize the corresponding disc 106. The preamp 140 is preferably disposed within the confines of the HDA 101 as shown in FIG. 1.

During a data read operation wherein previously stored data are retrieved from the disc 106, the preamp 140 applies a read bias current to the head 120 and monitors the voltage across a magneto-resistive (MR) element of the head 120, the voltage varying with respect to the selective magnetization of the disc 106. The detected voltage is preamplified by the preamp 140 to provide an amplified read signal to the read/write channel 136, which decodes the stored data and provides the same to the buffer of the interface circuit 134 for subsequent transfer to a host computer (not shown).

A spindle circuit 142 is provided to rotate the spindle motor 104 using back electromotive force (bemf) commutation. For reference, the discs 106 are nominally rotated at 7,200 revolutions per minute during operation.

A servo circuit (denoted generally at 144) controls the position of each of the heads 120 with respect to the corresponding discs 106 in response to servo information read from the discs 106 and passed to the servo circuit 144 by way of the preamp 140 and the mux 138. The servo circuit 144 includes a demodulator (demod) 146 which conditions the servo information for use by a digital signal processor (DSP) 148 having associated programming in memory (MEM) 150. The DSP 148 provides a current command signal to a coil driver 152, which outputs current to the coil 113 in order to position the heads 120 relative to the discs 106.

The servo circuit 144 operates in two primary, selectable modes: seeking and track following. During a seek, a selected head 120 is moved from an initial track to a destination track through the initial acceleration and subsequent deceleration of the head 120 toward the destination track. Once the head 120 has been settled onto the destination track, the servo circuit 144 operates in the track following mode, using the servo information to maintain the head over the destination track.

Figure 3:
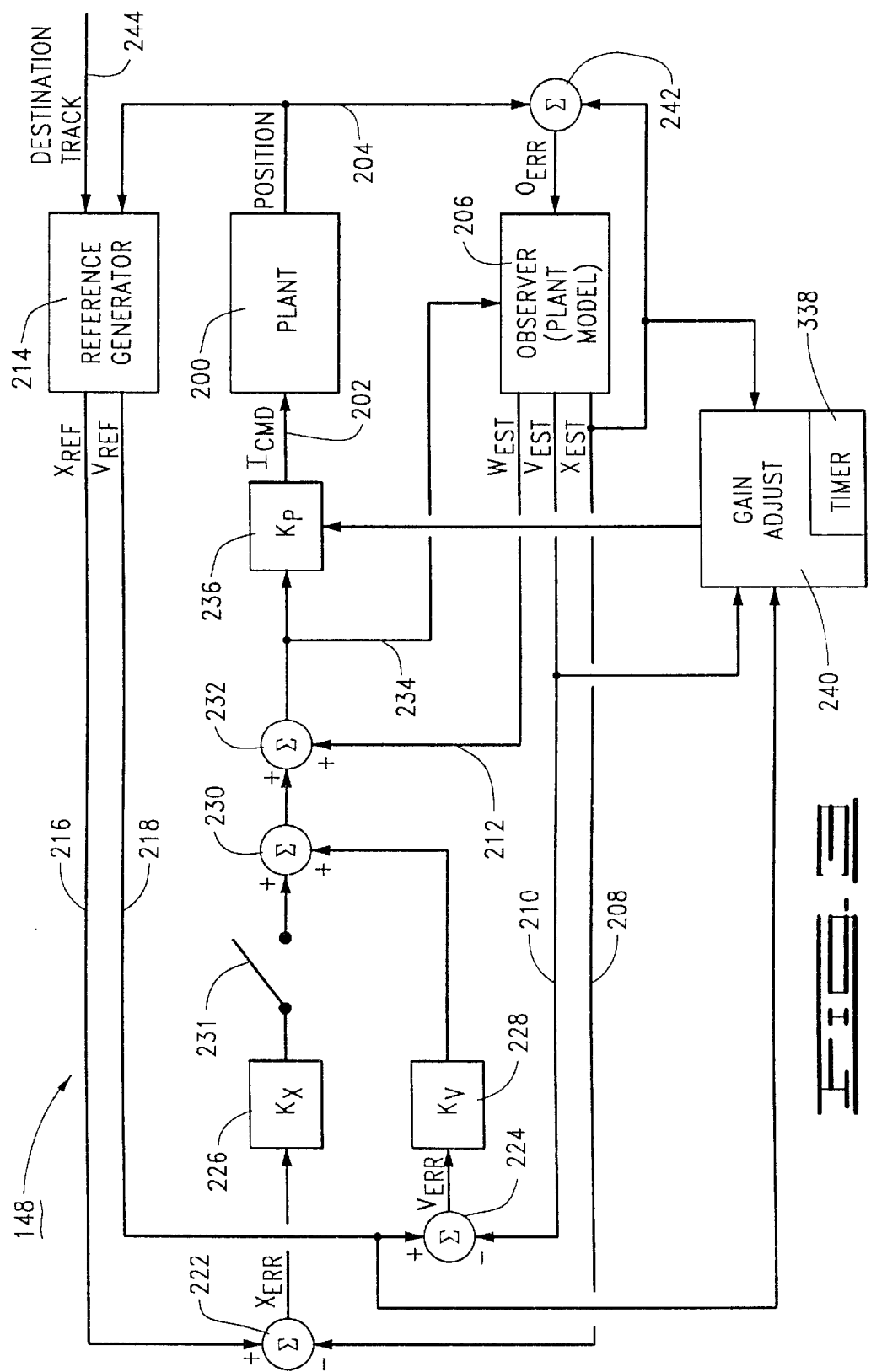
FIG. 3 is a control diagram representation of the operation of the servo circuit, with FIG. 3 generally representative of programming utilized by the DSP in accordance with a preferred embodiment.

FIG. 3 provides a control diagram representation of the servo circuit 144 of FIG. 2, constructed in accordance with a preferred embodiment of the present invention. It will be understood that the diagram of FIG. 3 is generally representative of programming utilized by the DSP 148 and sets forth functional aspects of the DSP 148 in accordance with a preferred embodiment.

With reference to FIG. 3, a plant block 200 is provided which is indicative of relevant electro-mechanical aspects of the disc drive 100, including the discs 106, the coil 113, the VCM 114, head 120, the demodulator 146 and the coil driver 152. The plant 200 receives a current command signal $I_{CMD}$ on signal path 202 to position a selected head adjacent a selected track of the plant 200. In response to servo information on the track, the plant 200 generates a position signal which is output on signal path 204, the position signal indicative of the actual position of the head 120 with respect to the corresponding disc 106. More particularly, the position signal is output by the demodulator 146 (FIG. 2) as a sequence of digital values each having a track address component indicative of the track proximate the head (i.e., the track over which the head is currently disposed) and a position error signal (PES) component indicative of the position of the head with respect to the proximate track.

The control diagram of FIG. 3 also shows an observer 206, or plant model, which is designed to have nominally the same input/output response characteristics as the plant 200. The observer 206 generates a position estimate $X_{EST}$, a velocity estimate $V_{EST}$ and a bias estimate $W_{EST}$ on signal paths 208, 210 and 212, respectively, which correspond to estimates of head position, head velocity and bias force. The bias force estimate $W_{EST}$ takes into account spring forces exerted upon the actuator as a result of the flexure assembly (such as 124 of FIG. 1), windage forces upon the heads, and the like.

Additionally, a reference generator 214 is provided which provides position reference $X_{REF}$ and velocity reference $V_{REF}$ signals indicative of the desired position and velocity settings for the plant 200. These signals are output on paths 216 and 218, respectively and have values which generally depend upon the particular operational mode of the servo circuit, such as track following or seeking. As will be recognized, the velocity reference $V_{REF}$ generally corresponds to the appropriate velocity profile (such as discussed above with reference to FIG. 4) during a seek operation.

A summing junction 222 determines a position error $X_{ERR}$ as the difference between the position reference $X_{REF}$ and the position estimate $X_{EST}$, as shown. Similarly, a summing junction 224 determines a velocity error $V_{ERR}$ as the difference between the velocity reference $V_{REF}$ and the velocity estimate $V_{EST}$. The position error $X_{ERR}$ is provided to a gain block 226 having a scalar gain of $K_X$ and the velocity error $V_{ERR}$ is provided to a gain block 228 having a scalar gain of $K_V$, so that the output quantities are summed by a summing junction 230 when switch 231 is closed (such as during track following). The switch 231 is opened during a seek, as seeks are velocity controlled and do not rely upon the position error $X_{ERR}$.

The output of the summing junction 230 is further summed with the bias estimate $W_{EST}$ at a summing junction 232. The output sum of the summing junction 232 is provided along functional path 234 as a control input to the observer 206 and comprises a current correction input indicative of the amount of current to be applied to the plant 200. To account for nominal variations in the operation of the plant 200, the output of the summing junction 232 is also provided to a gain block 236 having a servo gain $K_P$ (also referred to as "system gain"), so that the output thereof comprises the current command $I_{CMD}$ signal on path 202. As explained in greater detail below, the gain $K_P$ is adaptively adjusted by a gain adjust block 240 to ensure the observer 206 maintains an accurate model of the plant 200, thereby improving the settling performance of the servo circuit 144.

Finally, it will be noted that the position signal on path 204 is summed with the position estimate $X_{EST}$ on path 208 by a summing junction 242 to generate an observer error $O_{ERR}$ signal as an input to the observer 206. The position signal is further provided as an input to the reference generator 214, which also receives a destination track input from the drive processor 130 (as represented along path 244) to identify the destination track during a seek operation.

Before discussing the operation of the gain adjust block 240 of FIG. 3, reference is made to FIG. 4 which shows a graphical representation of a velocity profile (denoted generally at 250). The velocity profile 250 defines the desired velocity trajectory of a selected head 120 of the disc drive 100 during a seek operation wherein the head 120 is moved from an initial track and settled onto a destination track. As shown in FIG. 4, the velocity profile 250 is plotted against an x-axis 252 indicative of position (measured in tracks to go, with track "0" being the destination track) and a y-axis 254 indicative of the velocity of the head 120.

As shown in FIG. 4, a deceleration trajectory portion 256 is provided to define the desired velocity of the head 120 as the head decelerates to the destination track. The deceleration trajectory portion 256 extends to a maximum velocity $V_{MAX}$ (indicated by dotted line 258) which is a maximum velocity that the head 120 obtains as the head moves to the destination track.

FIG. 4 further shows an acceleration trajectory portion 260, which begins at a track identified at "A" on the x-axis 252. When the disc drive 100 performs a seek operation from track A to track 0, the head 120 is accelerated along portion 260, coasts along line 258 at $V_{MAX}$ and is then decelerated along portion 256 to the destination track 0. As will be recognized, seeks from other tracks are similarly effected. In some cases, a seek length can be short enough that the head 120 does not reach the maximum velocity $V_{MAX}$, such as generally shown by acceleration portion 282 which begins at a track "B" (as identified on the x-axis 252). That is, to seek from track B to track 0, the head 120 is accelerated along portion 282 until it reaches the deceleration portion 256, after which the head 120 is decelerated to the destination track 0 along the deceleration portion 256 as before.

FIG. 5 provides a generalized representation of a current profile 290 which is applied to the coil 113 during a seek from track A to track 0. The current profile 290 is plotted against an x-axis 292 indicative of position (in terms of tracks to go) and a y-axis 294 indicative of current magnitude. From FIGS. 4 and 5, it can be seen that a large amount of current is initially applied (as shown at 296 of the current profile 290) to accelerate the head 120 toward the target track 0. Once the head 120 reaches $V_{MAX}$ (portion 258 of FIG. 4), relatively little additional current is required to maintain the head at this velocity, as shown by intermediate portion 298 of the current profile 290. When the deceleration portion 256 is reached, a corresponding large amount of current of opposite polarity (as shown at 300 of the profile 190) is applied to the coil 113 to decelerate the head 120 to the track 0.

When the track reaches a selected distance from the destination track 0 (such as one track away), the servo circuit 144 transitions from a seek mode to a settle mode, and attempts to settle the head 120 onto the destination track 0 in as short a time as possible. The head should desirably have a settle transition velocity of selected magnitude at this point.

Due to various effects inherent in modern disc drive designs, however, velocity errors can arise at the settle transition point, resulting in either undershoot (as represented by an undershoot settle trajectory curve 302 in FIG. 6) or overshoot (as represented by overshoot settle trajectory curve 304 of FIG. 6). Both the curves 302, 304 are plotted in FIG. 6 against an x-axis 306 generally indicative of elapsed seek time and a y-axis 308 indicative of position (with "0" on the y-axis 308 of FIG. 6 corresponding to the center of the destination track 0 of FIGS. 4 and 5).

The undershoot trajectory curve 302 of FIG. 6 arises when the settle transition velocity of the head 120 is too low, resulting in the head 120 having insufficient velocity to reach the center of the track 0 (or a predetermined threshold about the center of track 0, such as ±10% of the track width, defining a range within which read and write operations can be safely performed). Likewise, the overshoot trajectory curve 304 arises when the settle transition velocity of the head 120 is too high, resulting in the head 120 coming in too fast and undesirably oscillating about the center of the track 0. For reference, an ideal settle response curve 310 is also shown in FIG. 6.

The manner in which the gain adjust block 240 of FIG. 3 operates to adaptively adjust the servo gain $K_P$ to achieve optimal settling response (as shown at 310 in FIG. 6) will now be discussed. Generally, the following relationship is used to update the servo gain value at the conclusion of each seek:

$$K_P^+ = K_P + C_1(\text{VERR}_{SUM} - \text{VERR}_{NOM}^+) \tag{1}$$

where $K_P^+$ represents the updated servo gain value provided to the gain block 236 (FIG. 3) by the gain adjust block 240 (the subscript "+" denoting a most recently obtained value), $K_P$ is the previous value of servo gain and $C_1$, is a convergence constant (preferably a small value less than one, such as 0.2). The values $\text{VERR}_{SUM}$ and $\text{VERR}_{NOM}^+$ are accumulated velocity error values, determined as follows.

Figure 7:
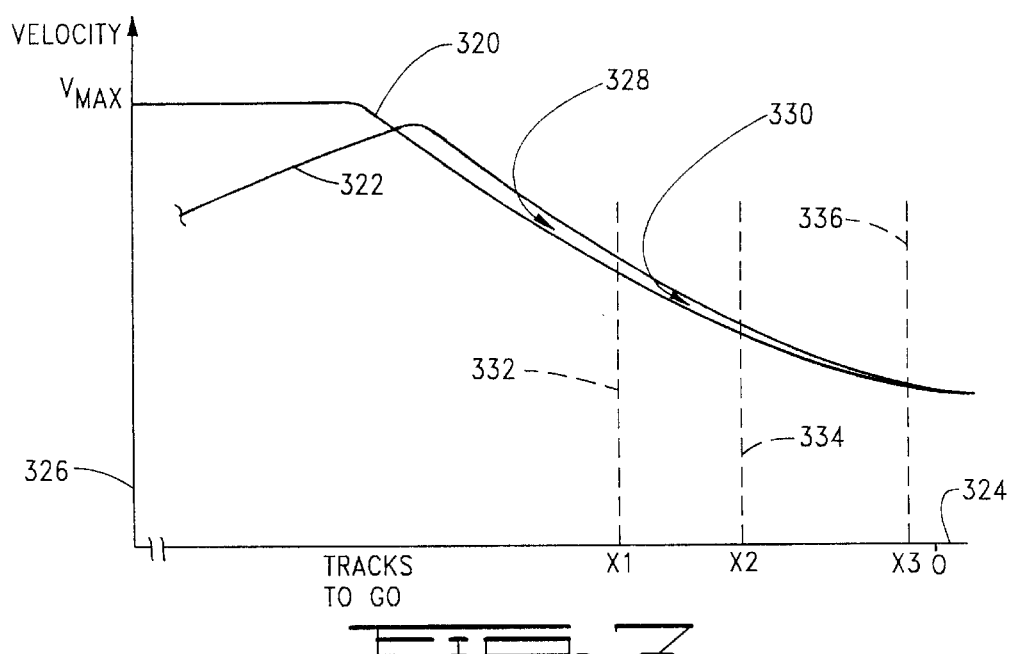
FIG. 7 provides a graphical representation of a velocity profile used by the servo circuit to define a desired velocity trajectory for a selected head during a seek operation.

FIG. 7 shows a graphical representation of a portion of a selected velocity profile curve 320, generally similar to the velocity profile 250 discussed above in FIG. 4. Also shown in FIG. 7 is an actual velocity curve 322, indicative of the actual velocity of the head 120 during a seek. It will be understood that the velocity curve 322 is determined by successive values of the velocity estimate $V_{EST}$ of FIG. 3. The curves 320, 322 are plotted against an x-axis 324 indicative of position (in terms of tracks to go to the destination track 0) and a y-axis 326 indicative of velocity amplitude.

As shown in FIG. 7, a small following error exists between the velocity profile curve 320 and the actual velocity curve 322, such error indicated by the bounded area (denoted generally at 328) between these curves. This error is characteristic of disc drives such as 100 and is not necessarily undesirable, as long as the amount of this error is controlled as explained below.

During each seek, the gain adjustment block 240 (FIG. 3) integrates, or sums, the velocity error over a range defined by positions $X_1$ and $X_2$ (discrete points that are reached at predetermined distances from the track 0) to obtain the accumulated velocity error value $\text{VERR}_{SUM}$ as follows:

$$\text{VERR}_{SUM} = \sum_{k=X_1}^{X_2} (V_{EST}(k) - V_{PROF}(k)) \tag{2}$$

with k comprising successive estimated position $X_{EST}$ values, $V_{EST}(k)$ the estimated velocity at each sample k, and $V_{PROF}(k)$ the corresponding value of the velocity profile curve 320 at each sample over the indicated interval. It will be recognized that the resulting value $\text{VERR}_{SUM}$ corresponds to the area 330 of FIG. 7, bounded by the curves 320, 322 and dotted lines 332, 334 which extend from points $X_1$, $X_2$ respectively. For reference, $X_1$ is preferably located at a position 30 tracks away from the destination track (track 0) and $X_2$ is preferably located 18 tracks away from the destination track. The gain adjustment block 240 accordingly initiates the summation of the $\text{VERR}_{SUM}$ value when the estimated position $X_{EST}$ indicates that point $X_1$ has been reached, and concludes the summation when $X_{EST}$ indicates that point $X_2$ has been reached.

The accumulated velocity error value $\text{VERR}_{NOM}^+$ of equation (1) is a nominal value which is also determined during each seek in accordance with the following relationship:

$$\text{VERR}_{NOM}^+ = \text{VERR}_{NOM} + C_2(T_{ACT} - T_{NOM}) \tag{3}$$

where $\text{VERR}_{NOM}^+$ is the most recently updated value, $\text{VERR}_{NOM}$ is the previous value, $C_2$ is a convergence constant (selected to be less than one, such as 0.1), $T_{ACT}$ is a measured elapsed time for the head to pass between two selected points and $T_{NOM}$ is a nominal elapsed time. The $T_{ACT}$ value preferably comprises a measurement of the time required for the head to pass from the point $X_1$ to another defined point $X_3$, which is indicated by dotted line 336 in FIG. 7.

The elapsed time is preferably obtained using a timer 338 of the gain adjust block 240 (FIG. 3) which counts elapsed cycles from a high frequency clock (not separately shown) over the selected interval. That is, the timer 338 is enabled when the position estimate $X_{EST}$ reaches $X_1$ and is disabled when $X_{EST}$ reaches $X_3$. Preferably, $X_3$ is located at a position one track away from the destination track, which is the settling transition point at which the servo circuit 144 initiates the settling of the head 120 onto the destination track. The $T_{NOM}$ value is preferably obtained empirically from a population of nominally identical drives.

As will be recognized, the time $T_{ACT}$ will have a nominal value when the disc drive 100 exhibits optimal settling performance, as indicated by response curve 310 of FIG. 6. However, the time $T_{ACT}$ will typically increase when undershoot (curve 302) is present and will typically decrease when overshoot (curve 304) is present.

Figure 8:
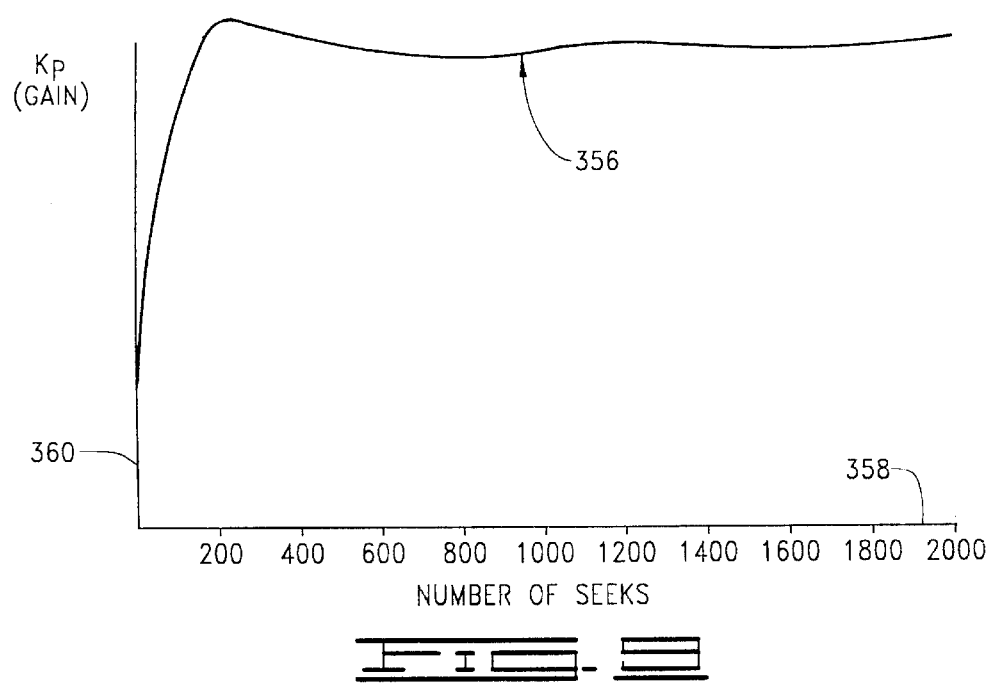
FIG. 8 provides a flow diagram for an ADAPTIVE GAIN ADJUSTMENT routine, in accordance with a preferred embodiment of the present invention. The routine of FIG. 8 is representative of programming utilized by the DSP of FIG. 3 in accordance with a preferred embodiment.

The operation of the gain adjust block 240 can now be understood with reference to a first ADAPTIVE GAIN ADJUSTMENT routine 340 of FIG. 8, formatted in accordance with a preferred embodiment of the present invention. It will be understood that FIG. 8 is representative of programming utilized by the DSP 148 during each velocity-controlled seek of the disc drive 100.

As shown in FIG. 8, the seek is first initiated at step 342, so that a current profile is applied to the coil 113 (such as shown at 290 of FIG. 5) to first accelerate and then decelerate the selected head 120 toward the destination track. As the head 120 is decelerated toward the destination track, the predetermined points $X_1$ (30 tracks away) and $X_2$ (18 tracks away) are sequentially reached and the gain adjust block 240 integrates the velocity error as provided above over this interval to obtain the accumulated velocity error $VERR_{SUM}$, step 344. Next, as shown by step 346, the elapsed time $T_{ACT}$ is determined by measuring the time required for the head to pass from point $X_1$ (30 tracks away) to $X_3$ (one track away).

The updated value $VERR_{NOM}^+$ is next determined in accordance with equation (3) at step 348, and this value is subsequently used to determine the updated servo gain value $K_P^+$ in accordance with equation (1) above, step 350. Finally, the gain of the gain block 236 (FIG. 3) is adjusted to the updated value $K_P^+$ at step 352 and the routine ends at step 354. As will be recognized, the updated servo gain value is used by the servo circuit 144 until the next adaptive adjustment at the conclusion of the next velocity-controlled seek.

In this way, the gain of the servo circuit 144 is continuously adapted to conditions which tend to change the response characteristics of the plant 200. This dual-level adaptation (velocity error and elapsed time) ensures that stable operation is maintained as the system converges the values of $VERR_{NOM}$ and $K_P$ over a series of successive seek operations. To illustrate the controlled convergence of $K_P$ and $VERR_{NOM}$, FIGS. 9 and 10 have been provided which show a $K_P$ convergence curve 356 (plotted against an x-axis 358 indicative of number of successive seeks and a y-axis 360 indicative of gain amplitude) and a $V_{NOM}$ convergence curve 362 (plotted against an x-axis 364 indicative of number of successive seeks and a y-axis 366 indicative of gain amplitude).

The rates of convergence of $K_P$ and $V_{NOM}$ are in large part controlled by the values of $C_1$ and $C_2$. While larger values for these convergence constants will generally result in faster system response, better operational performance has been generally observed through slower convergence rates, on the basis that those factors that tend to change the settling characteristics of the plant (most notably temperature) change at a sufficiently low rate in comparison to the rate at which successive seeks are performed. Of course, different responses may be desired depending upon the requirements of a given application, and such can be readily adapted by the DSP 148. For example, faster convergence (i.e., increases in the values of $C_1$ and $C_2$) can be obtained in response to indications by a temperature sensor (not shown) that rapidly occurring temperature excursions are taking place.

Having concluded a discussion of a first preferred embodiment as set forth by the routine of FIG. 8, a second, alternative preferred embodiment will now be discussed. It is contemplated that it may be desirable in some cases to provide enhanced adaptation of the servo gain, in accordance with the following relationship:

$$K_P^+ = K_P + C_3(T_{NOM} - T_{ACT}) \quad (4)$$

where as before, $K_P^+$ is the updated servo gain value, $K_P$ is the previous servo gain value, $C_3$ is a convergence constant, $T_{ACT}$ is elapsed time for the head to pass over a selected interval (such as from point $X_1$ to $X_3$ in FIG. 7) and $T_{NOM}$ is a corresponding, nominal elapsed time. In this case, the servo gain is adaptively adjusted directly as a function of changes in elapsed time, without respect to velocity error. FIG. 11 sets forth the corresponding steps in such an approach.

More particularly, FIG. 11 provides a second, alternative ADAPTIVE GAIN ADJUSTMENT routine 370, in accordance with a preferred embodiment. As with the routine of FIG. 8, the routine of FIG. 11 is representative of programming utilized by the DSP 148.

As shown in FIG. 11 at step 372, each seek is initiated as before, with the elapsed time $T_{ACT}$ (as measured from points $X_1$ to $X_3$) being measured at step 374. The updated servo gain $K_P^+$ is next determined in accordance with equation (4) above at step 376 and this updated servo gain is applied to the gain block 236 (FIG. 3), step 378. The routine then ends at 380.

The methodology of FIG. 11 generally provides faster convergence of the servo gain over that of FIG. 8, as illustrated in FIG. 12 by a $K_P$ convergence curve 382 (plotted against an x-axis 384 indicative of the number of successively performed seeks and a y-axis 386 indicative of gain amplitude). It is contemplated that the requirements of a given application will generally dictate the desired approach, whether that of FIG. 8 or FIG. 11, and that it may be desirable to selectively implement both at different times. For example, for the first few minutes after power up when large temperature excursions are typically encountered as the disc drive warms to an elevated operational temperature, it might be desirable to utilize the methodology of FIG. 11 and then switch thereafter at some appropriate point to the methodology of FIG. 8.

Accordingly, in view of the foregoing discussion it will be understood that the present invention is directed to an apparatus and method for improving servo performance of a disc drive through adaptive servo gain adjustment.

As exemplified in preferred embodiments, a disc drive 100 comprises a head 120 adjacent a rotatable disc 106 and a servo circuit 144 which controllably positions the head adjacent tracks defined on the disc. During a seek operation in which the servo circuit moves the head from an initial track to a destination track in relation to a velocity profile 250 indicative of a desired velocity trajectory of the head, the servo circuit accumulates a velocity error (step 344) as a sum of a series of velocity errors each obtained as a difference between an actual velocity of the head 322 and a corresponding desired velocity of the head 320 as set forth by the velocity profile over a selected radial distance of the disc.

The servo circuit additionally measures an elapsed time (steps 346, 374) for the head to pass between two points at selected distances from the destination track. Thereafter, the servo circuit adjusts a gain (steps 350, 352, 376, 378) of the servo circuit used to control the disc drive during a subsequent seek operation in relation to the accumulated velocity error and the measured elapsed time.

For purposes of the appended claims, consistently with the foregoing discussion the term "circuit" will be understood to cover both hardware and firmware implementations. The term "programmable processing device" will be understood to describe a device that utilizes a series of programmed commands in memory to execute a series of operations, such as the DSP 148 of FIG. 3. Moreover, although method steps have been set forth in various claims in a particular order, it will be recognized that the scope of such claims is not necessarily limited to performance in such order.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for improving servo performance of a disc drive having a head adjacent a rotatable disc, the method comprising steps of:
   (a) initiating a seek operation wherein the head is moved from an initial track to a destination track on the disc in relation to a velocity profile indicative of a desired velocity trajectory of the head;
   (b) accumulating velocity error as a sum of a series of velocity errors each obtained as a difference between an actual velocity of the head and a corresponding desired velocity of the head as set forth by the velocity profile over a selected radial distance of the disc as the head is decelerated toward the destination track;
   (c) measuring an elapsed time for the head to pass over a second selected radial distance of the disc as the head is decelerated toward the destination track; and
   (d) adjusting a gain used to control the disc drive during a subsequent seek operation in relation to the accumulated velocity error and in relation to the measured elapsed time.

2. The method of claim 1, wherein the adjusting step (d) comprises steps of:
   (d1) adjusting a nominal accumulated velocity error in relation to the measured elapsed time and a nominal elapsed time; and
   (d2) adjusting the gain in relation to a difference between the accumulated velocity error and the adjusted nominal accumulated velocity error.

3. A disc drive, comprising:
   a head adjacent a rotatable disc on which a plurality of nominally concentric tracks are disposed; and
   a servo circuit, operably coupled to the head, which performs a seek operation to move the head from an initial track to a destination track, the servo circuit adaptively adjusting a gain of the servo circuit in relation to a difference between a measured elapsed time for the head to pass over a selected radial distance of the disc as the head is decelerated toward the destination track and a corresponding nominal elapsed time.

4. The disc drive of claim 3, wherein the servo circuit further adjusts the gain in relation to a difference between an accumulated velocity error as the head passes over a second selected radial distance of the disc as the head is decelerated toward the destination track and a nominal accumulated velocity error.

5. The disc drive of claim 4, wherein the servo circuit adjusts the nominal accumulated velocity error in relation to the measured elapsed time and the nominal elapsed time, and further adjusts the gain in relation to a difference between the accumulated velocity error and the adjusted nominal accumulated velocity error.

6. The disc drive of claim 3, wherein the servo circuit comprises:
   an observer which provides estimates of head position and velocity during the seek operation; and
   a gain block operably coupled as an input to the observer which applies the gain to a current correction command signal to improve the estimates of head position and velocity provided by the observer.

7. The disc drive of claim 6, further comprising a gain adjust block, operably coupled to the observer and the gain block, which provides an adjusted gain to the observer in response to the estimates of head position and velocity from the observer.

8. A disc drive, comprising:
   a head adjacent a rotatable disc on which a plurality of tracks are defined; and
   position means, operably coupled to the head, for positioning the head adjacent the tracks of the disc.

9. The disc drive of claim 8, wherein the position means comprises:
   a servo circuit, operably coupled to the head, which performs a seek operation to move the head from an initial track to a destination track and adaptively adjusts a gain of the servo circuit in relation a measured elapsed time for the head to pass from a point at a selected distance from the destination track until the head is settled onto the destination track and a corresponding nominal elapsed time.

10. The disc drive of claim 9, wherein the servo circuit comprises a programmable processing device.

* * * * *